(12) United States Patent
Nordman

(10) Patent No.: US 6,889,938 B1
(45) Date of Patent: May 10, 2005

(54) STRUCTURAL COCKPIT WINDOW AND METHOD OF MAKING SAME

(75) Inventor: Paul S. Nordman, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/690,101

(22) Filed: Oct. 21, 2003

(51) Int. Cl.[7] ................................................ B64C 1/14

(52) U.S. Cl. ............................. 244/129.3; 52/204.593

(58) Field of Search ............................ 244/129.3, 117, 244/119; 52/204.593, 309.13, 286.11; 428/412, 428/413; 114/361; 105/3; 296/210–215

(56) References Cited

U.S. PATENT DOCUMENTS

| | | | |
|---|---|---|---|
| 3,897,033 A | | 7/1975 | Harding et al. |
| 4,004,388 A | * | 1/1977 | Stefanik ................ 52/204.593 |
| 4,134,389 A | * | 1/1979 | McClintock ................ 126/591 |
| 4,964,594 A | | 10/1990 | Webb |
| 5,039,566 A | | 8/1991 | Skubic et al. |
| 5,128,678 A | | 7/1992 | Novak et al. |
| 5,622,115 A | * | 4/1997 | Ehrlich et al. ................. 105/3 |

(Continued)

FOREIGN PATENT DOCUMENTS

WO     WO96/30203     10/1996

OTHER PUBLICATIONS

James R. olson, Delbert E. Day, James O. Stoffer, "Fabrication and Mechanical Properties of an Optically Transparent Glass Fiber/Polymer Matrix Composite", Journal of Composite Materials, vol. 26, No. 8, 1992, pp. 1181-1192.

Hongy Lin, Delbert E. Day, James O. Stoffer, "Optical and Mechanical Properties of Optically Transparent Poly(methyl) Composites", Polymer Engineering and Science, vol. 32, No. 5, Mid-Mar., 1992, pp. 344-350.

Hongy Lin, Seung-Gu Kang, Delbert E. Day, James O. Stoffer, "The Effect of Fiber Annealing on the Properties of An Optically Transparent Pmma Composite" Composites Science and Technology, 1994, 4 pages.

Kevin D. Weaver and James O. Stoffer, "Interfacial Bonding and Optical Transmission for Transparent Fiberglass/Poly (Methyl Metchacrylate) Composites" Polymer Composites, Apr., 1995, pp. 161-169.

(Continued)

*Primary Examiner*—Galen Barefoot
(74) *Attorney, Agent, or Firm*—Harness Dickey & Pierce P.L.C.

(57) ABSTRACT

A window adapted to be integrally formed with a skin of an aircraft having a first transparent fiberglass layer, a second transparent fiberglass layer, and a transparent epoxy layer. The transparent epoxy layer is located between the first and second transparent fiberglass layers. A glass outer-pane is removably coupled to the first transparent fiberglass layer such that the glass outer-pane covers the first transparent fiberglass layer. The first and second transparent fiberglass layers have an index of refraction approximately matching an index of refraction of the transparent epoxy layer. The first and second transparent fiberglass layers are adapted to be integrally formed with the skin of the aircraft.

15 Claims, 2 Drawing Sheets

U.S. PATENT DOCUMENTS

| | | | |
|---|---|---|---|
| 5,665,450 | A | 9/1997 | Day et al. |
| 5,700,894 | A | 12/1997 | Krieg et al. |
| 5,759,658 | A * | 6/1998 | Piekos .................... 428/67 |
| 6,357,379 | B1 * | 3/2002 | Murphy, Jr. ............... 114/361 |
| 2004/0062934 | A1 * | 4/2004 | Miller et al. .............. 428/413 |

OTHER PUBLICATIONS

H. Lin D.E. Day, K.D. Weaver, J.O. Stoffer, "Temperature and wavelength dependent transmission of optically transparent glass fibre poly (methyl methacrylate) composites", Journal of Materials Science, 1994, pp. 5193-5198.

Hongy Lin, Delbert E. Day, James O. Stoffer, Aging Behavior of Optically Transparent Poly(Methyl Methacrylate) Composites, Polymer Composites, Oct., 1993, pp. 402-409.

Kevin D. Weaver, James O. Stoffer, Delbert E. Day, "Preparation and Properties of Optically Transparent Pressure-Cured Poly (Methyl Methacrylate Composites", Polymer Composites, Dec., 1993, pp. 515-523.

Hongy Lin, Delbert E. Day, James O. Stoffer, Model for the temperature dependent transmission of optically transparent poly(methyl methacrylate) composites.

* cited by examiner

STRUCTURAL COCKPIT WINDOW AND METHOD OF MAKING SAME

FIELD OF THE INVENTION

The present invention relates to aircraft cockpit windows and more particularly to an aircraft structural cockpit window integrally formed with the skin of the aircraft.

BACKGROUND OF THE INVENTION

Conventional aircraft windows and canopies have traditionally been formed while trying to balance considerations of weight, strength, durability, and cost. Various materials have been employed in an attempt to find an optimal balance. For example, glass, while hard and resistant to abrasion, is brittle and heavy. And transparent polymers, such as acrylic and polycarbonate, while lightweight and easily formed into complex shapes, are relatively weak compared to glass. Yet even with their limitations, both materials are commonly used in aircraft industry. A more recent innovation, transparent composite materials, offer the strength of glass with the lighter weight of polymers and are becoming more common within the industry. However, there remain some challenges to implementing these materials in the manufacture of aircraft cockpit windows. Specifically, cockpit windows and canopies must have sufficient strength to survive bird impacts, for example a 500 knot 5 lb impact event. Even if the window itself has sufficient strength to resist such an impact, it's mounting to the aircraft must also be of sufficient strength so that such an impact does not cause separation of the window from the surrounding skin panels to which it is attached.

One obvious arrangement has been to mount the aircraft cockpit window to a metal frame which in turn is coupled to the structural body of the aircraft. The metal frame provides the needed strength to hold the window to the aircraft. While this type of window assembly with a window coupled to a metal frame has served very well in the past, the metal frame remains a relatively heavy component.

Accordingly, it is an object of the present invention to provide an improved aircraft window assembly that provides the strength to resist impact events while simultaneously reducing the weight of the window assembly.

SUMMARY OF THE INVENTION

A window adapted to be integrally formed with a composite skin of a mobile platform is provided. The window includes a first transparent fiberglass layer, a second transparent fiberglass layer, and a transparent epoxy layer. The transparent epoxy layer is located between the first and second transparent fiberglass layers. A glass outer-pane is removably coupled to the first transparent fiberglass layer such that the glass outer-pane covers the first transparent fiberglass layer. The first and second transparent fiberglass layers have an index of refraction matching an index of refraction of the transparent epoxy layer. The first and second transparent fiberglass layers are adapted to be integrally formed with the composite skin of the mobile platform.

By integrally bonding the window fiberglass layers to the composite skin as an integral portion of the skin, the manufacturing steps of framing and bolting are eliminated. This in turn reduces the weight and cost of the window assembly. Also, the easily replaceable glass outer-pane assures that the integrally formed window will be protected from normal wear, such as light impacts and abrasion from windshield wipers.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
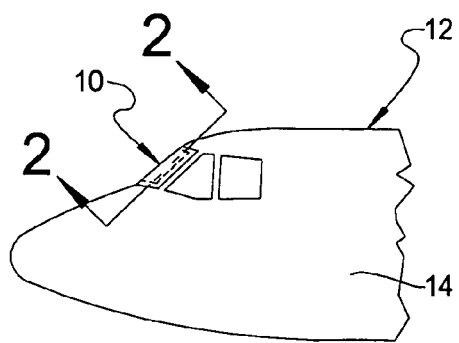
FIG. 1 is a partial view of a front of an aircraft having a cockpit window constructed according to the principles of the present invention.

Referring to FIG. 1, there is illustrated a window assembly 10 constructed according to the principles of the present invention shown mounted to an aircraft 12. While in the particular example provided the window assembly 10 is illustrated as a cockpit window, it is to be understood that the window assembly 10 may be used in any number of aircraft applications including side viewing windows, canopies, or any other area of an aircraft requiring structurally strong transparent ports for allowing viewing therethrough. The aircraft 12 has a skin 14 surrounding the window assembly 10. The aircraft skin 14 is a plastic skin reinforced with fibers, for example carbon fibers, as will be described in greater detail below.

Figure 2:
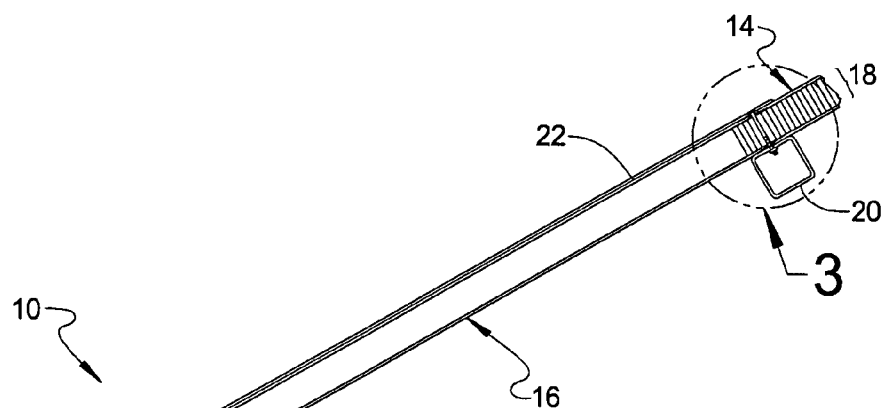
FIG. 2 is a side cross sectional view of the cockpit window taken in the direction of arrow 2—2 in FIG. 1.

With reference to FIG. 2, the window assembly 10 generally includes a window 16, a transition portion 18 which defines an opening in the skin 14 of the aircraft 12, a pair of tubular composite sills 20, and a glass outer-pane 22.

Figure 3:
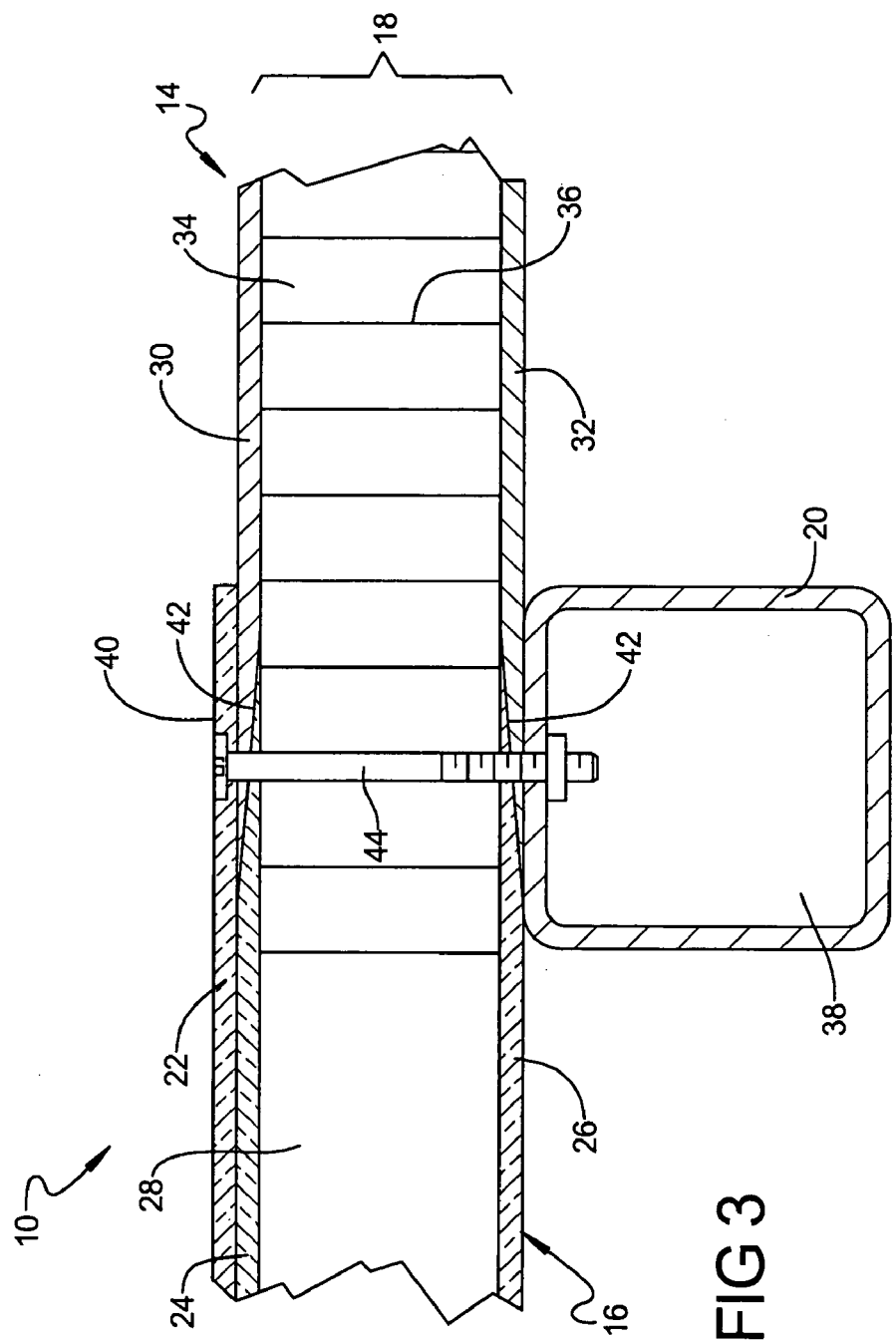
FIG. 3 is an exploded view of a portion of the cockpit window indicated by circle 3—3 in FIG. 2.

Turning to FIG. 3, the window 16 includes an outer fiberglass ply 24, an inner fiberglass ply 26, and an epoxy layer 28. The epoxy layer 28 is formed between the outer and inner fiberglass plies 24, 26. The outer and inner fiberglass plies 24, 26 and the epoxy layer 28 are each transparent. The outer and inner fiberglass plies 24, 26 have an index of refraction approximately matching that of the epoxy layer 28. Preferably, the epoxy is an aliphatic epoxy that does not degrade in ultraviolet light, though various other types of transparent resins may be employed. Moreover, the epoxy may be reinforced, for example with chopped fibers within the epoxy. The epoxy layer 28 transfers shear forces between the outer fiberglass ply 24 and the inner fiberglass ply 26.

The transition portion 18 of the aircraft skin 14 includes an outer layer 30, an inner layer 32, and a middle layer 34. As noted above, the outer and inner layers 30, 32 are formed from a fiber reinforced plastic. The middle layer 34 is mounted between the outer and inner layers 30, 32. In the particular example provided, the middle layer 34 includes a honeycomb structure 36 that provides structural support to the aircraft skin 14. Alternatively, the middle layer 34 may be a solid laminate that provides the necessary structural support.

The tubular composite sills 20 have a hollow interior 38 and replace the aluminum sills used in the prior art. The tubular composite sills 20 are coupled to the structural frame (not shown) of the aircraft 12 and provide structural support to the window 16, as will be described in greater detail below.

The glass outer-pane 22 is a sheet of transparent glass removably mounted to the outer surface of the window 16 and transition portion 18 of the aircraft skin 14. The glass outer-pane 22 has a hard outer surface 40 useful for enduring the rubbing action from the windshield wipers (not shown) of the aircraft 12. Moreover, electric conductors (not shown) are embedded within the glass outer-pane 22 for de-icing the window 16.

Referring generally to FIGS. 2 and 3, the aircraft skin 14 is fixed to the tubular composite sills 20 at the transition portion 18. The tubular composite sills 20 provide a frame for the window 16. The window 16 is inserted into the transition portion 18 of the aircraft skin 14 and then bonded thereto at a joint 42 or lap splice. The window 16 acts as a plate extending between the tubular composite sills 20 and has a bending capability due to the material qualities of the outer and inner fiberglass plies 24, 26 and the epoxy layer 28.

The joint 42 is an angled interface between the outer fiberglass ply 24 and the outer layer 30 as well as between the inner fiberglass ply 26 and the inner layer 32. An autoclave (not shown) is used to melt the plastics of the outer and inner fiberglass plies 24, 26 and the outer and inner layers 30, 32 at the joint 42 such that the material commingles and bonds. Any load on the window 16 is transferred from the fiber threads (not shown) in the outer and inner fiberglass plies 24, 26 to the outer and inner layers 30, 32 of the aircraft skin 14 through the commingled plastic material.

The glass outer-pane 22 is removably fastened to the outside of the window 16 in order to protect the window 16 from normal wear. In the particular example provided, bolts 44 (one of which is shown) are used to secure the glass outer-pane through the aircraft skin 14 and the window 16 to the tubular composite sill 20. Alternatively, various other fasteners may be used such as, for example, clips, screws, or adhesives. The glass outer-pane 22 is non-structural and is designed to shatter under impact. The glass outer-pane 22 may be easily replaced after breaking or normal wear by removing the bolts 44.

By integrally bonding the window 16 to the aircraft skin 14 as an integral portion of the skin 14, the manufacturing steps of framing and bolting are eliminated. This in turn reduces the weight and cost of the window assembly 10. Also, the easily replaceable glass outer-pane 22 assures that the integrally formed window 16 will be protected from normal wear, such as light impacts and abrasion from windshield wipers.

While the window assembly 10 has been described in connection, with an aircraft, it will be appreciated that the invention could readily be incorporated with little or no modification into any structure, fixed or mobile, that makes use of composite panels.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A window adapted to be integrally formed with a composite skin of a mobile platform, comprising:
   a first transparent fiberglass layer;
   a second transparent fiberglass layer; and
   a transparent epoxy layer between the first and second transparent fiberglass layers;
   wherein the first and second transparent fiberglass layers have an index of refraction at least approximately matching an index of refraction of the transparent epoxy layer; and
   wherein the first and second transparent fiberglass layers have edge portions that are arranged to overlap with portions of said skin such that said window forms an integral structural portion of said skin.

2. The window of claim 1, further comprising a glass outer-pane removably coupled to the first transparent fiberglass layer such that the glass outer-pane covers the first transparent fiberglass layer.

3. The window of claim 1, further including at least one tubular composite sill adapted to be coupled to the panel of the mobile platform, the first and second transparent fiberglass layers being secured to said composite sill.

4. The window of claim 1, further including a pair of tubular composite sills adapted to be coupled to the panel of the mobile platform, the first and second transparent fiberglass layers extending between the pair of tubular composite sills.

5. The window of claim 1, wherein the transparent epoxy layer comprises an aliphatic epoxy.

6. An aircraft comprising:
   an outer skin having an outer layer and an inner layer, the outer skin supported on a sill; and
   a window having a first transparent layer, a second transparent layer, and a transparent epoxy layer between the first and second transparent layers, the first and second transparent layers have an index of refraction matching an index of refraction of the transparent epoxy layer;
   wherein the first transparent layer is bonded to the outer layer and the second transparent layer is bonded to the inner layer; and
   wherein the first and second transparent layers overlap said outer and inner layers to form an integral portion of said skin.

7. The aircraft of claim 6, further including a glass outer-pane coupled to the first transparent fiberglass layer.

8. The aircraft of claim 6, wherein the transparent epoxy layer comprises an aliphatic epoxy.

9. The aircraft of claim 6, wherein the refraction index of the first transparent layer, the second transparent layer, and the transparent epoxy layer is approximately the same.

10. The aircraft of claim 6, further comprising a second tubular composite sill, the window extending between the two tubular composite sills.

11. The aircraft of claim 6, wherein the first transparent layer and the second transparent layer are comprised of fiberglass.

12. A method of integrally forming a window within an opening in a skin of a structure, comprising:
   providing a window having a first transparent layer, a second transparent layer, and a transparent epoxy layer between the first and second transparent layers;

providing a panel structure having an opening formed therethrough, the panel structure having a first plastic layer and a second plastic layer;

inserting the window into the opening;

securing the first transparent layer to the first plastic layer such that the material of the first transparent layer commingles with the material of the first plastic layer;

securing the second transparent layer to the second plastic layer such that the material of the second transparent layer commingles with the material of the second plastic layer; and the transparent layers and the plastic layers forming an integral portion of the skin.

13. The method of claim 12, further comprising removably fastening a glass outer-pane to the first transparent layer such that the glass outer-pane covers the first transparent layer.

14. The method of claim 12, wherein the transparent epoxy layer comprises an aliphatic epoxy.

15. The method of claim 12, wherein the refraction index of the first transparent layer, the second transparent layer, and the transparent epoxy layer is approximately the same.

* * * * *